(12) United States Patent
Bülow

(10) Patent No.: US 7,219,800 B2
(45) Date of Patent: May 22, 2007

(54) MODULAR ARRAY ARRANGEMENTS

(75) Inventor: Sven Bülow, Hamburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 10/783,412

(22) Filed: Feb. 20, 2004

(65) Prior Publication Data

US 2005/0183987 A1 Aug. 25, 2005

(51) Int. Cl.
*B65D 25/10* (2006.01)
*C12M 3/00* (2006.01)
(52) U.S. Cl. .................. 206/563; 206/564; 435/305.2; 435/297.5; 422/102
(58) Field of Classification Search ............... 206/6.1, 206/515, 499, 558, 560, 564, 725, 775, 562, 206/563, 526; 435/297.1, 305.1, 305.2, 305.4, 435/297.5; 422/101, 102; 220/23.87, 23.91, 220/23.4, 507
See application file for complete search history.

(56) References Cited

U.S. PATENT DOCUMENTS

| | | | | |
|---|---|---|---|---|
| 2,956,931 A | * | 10/1960 | Goldberg ..................... 435/5 |
| 4,252,897 A | * | 2/1981 | Axford et al. ................. 435/34 |
| 4,328,902 A | * | 5/1982 | North ........................ 220/23.4 |
| 4,785,953 A | * | 11/1988 | Buchholz et al. ............ 215/365 |
| 5,110,556 A | | 5/1992 | Lyman et al. |
| 5,310,071 A | * | 5/1994 | Rivlin et al. ............... 220/23.4 |
| 5,358,871 A | * | 10/1994 | Stevens et al. .......... 435/297.1 |
| 5,534,227 A | * | 7/1996 | Lahm et al. ................. 422/102 |
| 5,638,974 A | * | 6/1997 | Mann ......................... 220/23.4 |
| 5,710,043 A | * | 1/1998 | Pay ........................... 435/297.5 |
| 5,766,937 A | * | 6/1998 | Lahm et al. .............. 435/297.5 |
| D411,768 S | * | 7/1999 | Woodring .................... D3/314 |
| 5,922,289 A | | 7/1999 | Wong et al. |
| 2001/0005491 A1 | * | 6/2001 | Bara .......................... 422/102 |

FOREIGN PATENT DOCUMENTS

| | | |
|---|---|---|
| DE | 19730445 A1 | 1/1999 |
| DE | 20021326 U1 | 5/2001 |
| EP | 688602 A2 | 12/1995 |
| EP | 747476 A2 | 12/1996 |
| EP | 1260265 A1 | 11/2002 |
| EP | 1382392 A1 | 1/2004 |
| GB | 2240541 A * | 8/1991 |
| WO | WO 02/103331 A1 | 12/2002 |

* cited by examiner

*Primary Examiner*—Mickey Yu
*Assistant Examiner*—Jerrold Johnson
(74) *Attorney, Agent, or Firm*—Knobbe, Martens, Olson & Bear, LLP

(57) ABSTRACT

The present invention pertains to modular array arrangements comprising a carrier and at least one insert for attachment to said carrier, which at least one insert may be positioned in or on said carrier in a predetermined, fixed orientation. In addition, the present invention relates to an insert having first connecting means and at least one section adapted for the application of samples, to a method of preparing a modular array arrangement and to a method for using such modular array arrangements in a screening assay.

16 Claims, 3 Drawing Sheets

MODULAR ARRAY ARRANGEMENTS

BACKGROUND OF THE INVENTION

1. Field of the Invention

The present invention pertains to modular array arrangements comprising a carrier and at least one insert for attachment to said carrier, which at least one insert may be positioned in or on said carrier in a predetermined, fixed orientation. In addition, the present invention relates to an insert having first connecting means and at least one section adapted for the application of samples, to a method of preparing a modular array arrangement and to a method for using such modular array arrangements in a screening assay.

2. Description of the Related Art

In the recent past micro-arrays or micro-chips, respectively, have attracted a great deal of interest, since they allow screening for a high number of different samples in one single assay. Such micro-arrays normally comprise a solid surface bearing multiple samples, generally of biological nature, such as nucleic acids or proteins, which serve as so called capture probes in the assay. These capture probes are capable to bind to target molecules based on their inherent natural property in a specific manner. In the case of using oligo- or polynucleotides as capture probes, these molecules may bind to nucleotides exhibiting a sequence complementary to the sequence of the capture nucleotide, while in case of an antibody, as a representative of proteins, this antibody may bind to its specific antigen. In most studies involving micro-arrays, the target molecules derived from a sample are labeled and incubated with the array. Subsequently, the amount of material bound to the specific capture probes is determined by techniques, such as e.g. radioactivity, colorimetry or fluorescence.

However, most of the micro-arrays commercially available carry several thousands of capture probes and are, therefore, due to this huge number of capture probes to be synthesized, purified, quantified, and to be fixed on the solid support quite expensive and require a rather complicated data analysis. Yet, during an assay being performed, many capture probes are normally not of real interest, so that a given micro-array is utilized only partly, adding to waste and cost.

Thus, there is a need for micro-arrays allowing a flexibility in the assembly of capture probes and being adapted to the changing needs during the various assays to be performed. In order to meet commercial demands, such micro-arrays should be producible at low costs and be quickly available to a user.

SUMMARY OF THE INVENTION

These objectives have been achieved by providing a modular array arrangement comprising a carrier and at least one insert for attachment to said carrier. The at least one insert has a first connecting means arranged on or formed in at least one of the external walls of said at least one insert, while the carrier used has at least one location for receiving one of said at least one insert(s) and comprises a second connecting means, said second connecting means being arranged in, adjacent to or formed by said at least one location. Both of the first and second connecting means engage with each other in only one way, thus ensuring attachment of the insert on or in the carrier in a predetermined orientation only. In addition, said insert also has at least one section adapted for harboring a sample, which section may serve as at least one predetermined location of a micro-array.

The present invention provides a modular array arrangement comprising one or more different inserts, which inserts may be arranged on or in the carrier according to the momentary and changing needs of a user, thus allowing the user to arrange a micro-array on site in modular form. Due to the predetermined and unvariable orientation of the insert in or on the carrier false results based on a wrong orientation of the insert may be obviated. In addition, the elements of a modular array arrangement according to the present invention may be easily pre-fabricated and thereby produced at a low price.

DETAILED DESCRIPTION OF THE PREFERRED EMBODIMENT

Figure 1:
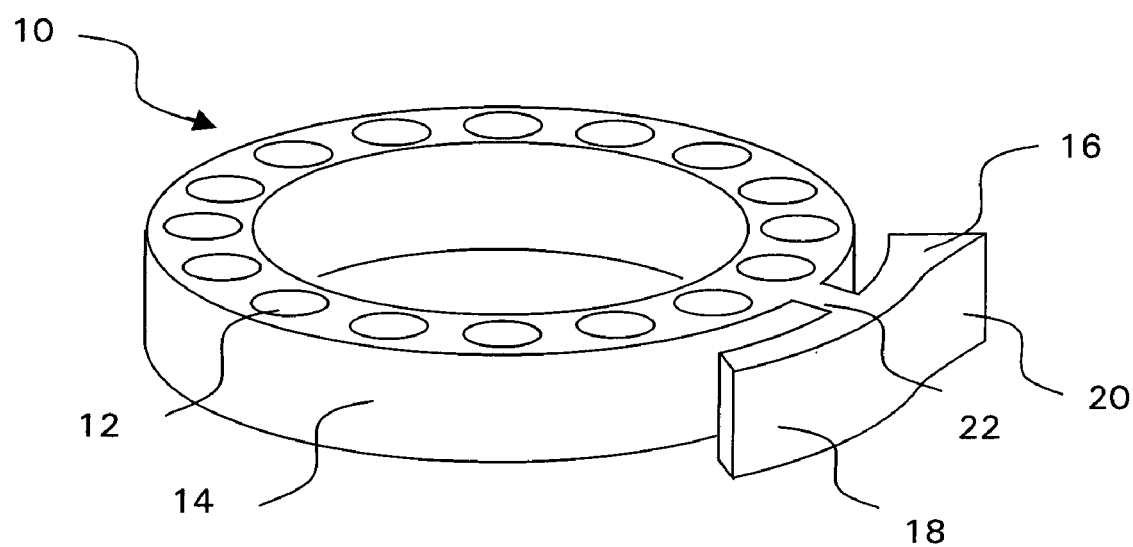
FIG. 1 shows an insert according to the present invention in form of a ring and having a connecting means of the key-type.

The term "array" as used in the present application may be understood as a collection of one or more section(s) arranged in a spatially defined and physically addressable manner, said section(s) being defined for receiving a sample and being provided with and/or adapted for receiving operational means.

The term "insert" as used in the present application shall designate any form that may be applied to a carrier, such as a container, a plate, a dish or a ring.

The term "sample" as used in the present application comprises any compound or mixture of compounds, in solid, liquid or gaseous form, which are of interest e.g. for performing an assay on the insert, as well as e.g. biological material when for example strains of interest have to be cultivated or examined.

The term "probe" as used in the present application shall designate any surface-immobilized molecule(s) that may bind to a particular target.

The term "target" as used in the present application pertains to any molecule that has an affinity for a given probe.

The present invention pertains to a modular array arrangement comprising one or more inserts for attachment to a carrier. The insert has a first connecting means arranged on or formed in at least one of the insert external walls, while the carrier to be used with the insert has at least one location for receiving the insert and comprises a second connecting means, which is arranged in, adjacent to or formed by said at least one insert module receiving location.

The first connecting means and/or the second connecting means are formed such that they allow engagement in one orientation only. This unidirectional engagement ensures that the insert, provided with the first connecting means will be aligned in a predetermined orientation in or on said carrier. As a result, an incorrect insertion of an insert and thus false test results may be excluded.

Any pair of first connecting means and second connecting means ensuring an unidirectional engagement of said first and said second connecting means and known to the skilled artisan is envisaged by the present invention. Consequently, the terms "first connecting means" and "second connecting means" should not be construed to comprise only the connecting means described in more detail below. In principle, the first connecting means is substantially or at least partially complementary to the second connecting means. For example, a first connecting means may be designed in form of a key-type means which is arranged on or formed in the insert external wall(s), and a second connecting means may be present in form of a lock-type means in or on the carrier. Alternatively, a first connecting means may be designed in form of a lock-type means which is arranged on or formed in the insert external wall(s) and a second connecting means may be present in form of a key-type means in or on the carrier. Moreover, the first connecting means may comprise both elements of the key-type and of the lock-type for matching with a second connecting means provided with corresponding, matching means comprising both elements of the lock-type and the key-type.

For ensuring an unidirectional engagement of the first and second connecting means, the first and/or second connecting means may have an asymmetric structure and/or form. This may for example be achieved by forming said connecting means to comprise two differently shaped arms, a lever with an asymmetric structure or parts provided with different structures on their surface. As outlined above, said asymmetric structure on or form of a first or second connecting means finds its substantially complementary counterpart on a corresponding second or first connecting means. Moreover, a unidirectional engagement of the connecting means may also be achieved when insert and first connecting means in combination have an asymmetric structure. For example, a first connecting means in form of a bar can be arranged on an insert in form of a ring such that said bar extends in a direction not passing through the center of the ring. In addition, the first and/or second connecting means may be adapted to serve as a grip. For example, one first connecting means may be arranged on the external lateral walls of the insert, as shown in FIG. 1, and may facilitate the introduction of the insert to its final position in or on the carrier. The provision of a grip provides the advantage that a contact of the user or of an automated device with sensitive or dangerous reagents or sensitive surfaces provided on the insert may be avoided during transfer of the insert to the carrier. In consequence, not only a more rapid and thereby more cost-effective method for arranging the inserts on or in said carrier may be provided, but also a method for arranging the inserts which is associated with a reduced health-risk for the user and a reduced risk of contaminating reagents present on the insert.

Depending on the respective requirements, said connection between the first connecting element and the second connecting element may be in form of a releasable or a non-releasable connection. A releasable connection provides the advantage that an insert of interest may be removed from the carrier and transferred to a second carrier wherein it may be submitted to an additional analysis or subsequent processing steps. Moreover, a releasable connection provides the advantage that the carrier may be used more than once.

For specific applications, the insert may be provided with one or more additional first connecting means and/or the insert receiving location may be provided with one or more additional second connecting means. For example, an insert may be provided with two or more connecting means such that it may be inserted into two or more insert receiving locations e.g. present on different carriers. Alternatively, an insert receiving location may be provided with two or more types of connecting means in order to permit an insertion of different types of insert modules. Moreover, e.g. an insert and the corresponding insert receiving location may be provided with two or more pairs of first and second connecting means in order to avoid any risk of an incorrect insertion, e.g. due to some broken or otherwise damaged connecting means. In addition, either the insert or the insert receiving location may be provided with two or more connecting means of the same type in order to allow alignment in more than one predetermined orientation.

If desired, said connecting means may be further supplemented with elements for improving the attachment of the insert to the carrier and/or for increasing the strength of said attachment, such as e.g. means of the latch type, bar type, spring type or combinations thereof. The connecting elements may be either integrally formed with an insert or carrier or may be present as an additional part fixed on the insert or carrier.

The carrier of the present invention is not restricted to any specific form. For example, the carrier may be present in form of a micro-plate having a plurality of wells which can be arranged in a variety of ways. For example, the carrier may have the general size and shape of a standard-sized microtiter plate with 96 wells (normally arranged in a format of 8×12 rows/columns illustrative example). Carriers dimensioned like or similar to standard array arrangements allow that already existing devices for handling and reading assays on micro-titer plates may be used or have to be slightly modified only. According to the specific application aimed at by the user, also micro-titer plates having a different design may be developed. The carrier of the present invention may also have the form of hybridization frames arranged on a slide. Moreover, a carrier may have insert receiving locations of any desired form, such as e.g. insert receiving locations in form of regular and irregular polygons or in oval form.

The carrier may be made from any material or any combination of materials according to the general knowledge of a skilled person in the art. In case of a carrier of a microtiter plate type, polymers already used for micro-titer plates including, for example, (poly)tetrafluoroethylene, (poly)vinylidenedifluoride, polypropylene, polystyrene, polycarbonate, or combinations thereof may be used. In case of a carrier of a slide type, any materials for slides known in the art may be used, such as e.g. glass, plastics, silicon, pyrolytic graphite, metal and/or metal alloys. When the carrier is used for an assay which is to be performed by sending a light beam through the bottom of the plate, the body of the plate should be transparent to the wavelengths of light used or should be provided with an opening on the bottom of the plate. A carrier according to the present invention may comprise any number of insert receiving locations, for example between 1 and 1000 insert receiving locations, preferably between 2 and 400 insert receiving locations, more preferably 24, 96 or 384 insert receiving locations.

Moreover, carriers of the present invention may be provided with means providing the possibility of coupling carriers together in order to obtain larger carrier elements.

The term "insert" as used in the present invention is not restricted to some specific type of insert. For example, an insert may be designed in form of a container type insert, a plate type insert, a dish type insert, or a ring type insert. The insert can be either attached on the surface of the carrier or can be partially or completely inserted in said carrier. The insert may also exhibit a specific form such that the form itself ensures that the insert may be transferred on or into the carrier in one way only. Such inserts are considered as representatives of a combination of insert and first connecting means and shall fall under the scope of protection of the present claims.

The insert may be made from any material or any combination of materials according to the general knowledge of a skilled person in the art and depending on the specific application aimed at with the modular array arrangement of the present invention. The insert normally comprises a body made from a material providing a desired physical stability and strength for handling. When the insert is used for an assay which is to be performed by sending a light beam through the part of the insert in close contact with the carrier (the bottom), said bottom should be transparent to the wavelengths of light being used. Preferably, an insert may be made of a non-fluorescent plastic material and is provided with an essentially circular bottom having a surface area which is smaller than the bottom surface area of a well of a standard microtiter plate.

The insert also has at least one section arranged on a part of the insert (the upper part, surface) opposite to the part that is in close contact with the carrier (the bottom), so that this section is accessible for the assay and determination of results. In addition, the insert may also be provided with means for facilitating identification of the insert, e.g. with identification signs (e.g. text or numbers applied by a device or a user, different colors as identification signs), and in particular with identification signs readable by a device, such as e.g. bar code signs.

The insert may be available either in a prefabricated, ready-to-use form or may be filled or supplemented by a user according to his desire. The form and volume of the sections provided on the surface of the insert may vary according to the desired application for the inserts. For example, the sections may have the form of a bowl, a star, a spot, or a rectangle and may be present as well in depressed form, planar form, or in raised form, e.g. depending on whether the incubation of several arrays with one sample takes place in the microplate well itself or whether spatially neighboring sections are incubated individually.

Probes may be attached either directly to the section of the insert or to a substrate, that may be, applied onto the section, such as a membrane, having essentially the form of the particular section and containing a limited number of specific, predetermined locations, such as e.g. of from 1 to 10 locations, onto which capture probes are spotted. The substrate may be made from silicon, glass or a surface-coated plastic material normally used in the art, functionalized glass, Si, Ge, GaAs, GaP, $SiO_2$, $SiN_4$, modified silicon, or any one of a wide variety of gels or polymers such as (poly)tetrafluoroethylene, (poly)vinylidenedifluoride, polystyrene, polycarbonate, polypropylene, or combinations thereof. Other substrate materials may be chosen by a skilled person on basis of his general knowledge in the art. Moreover, the surface of said substrate may be provided with additional material layers or spots, such as e.g. layers or spots of polymers, plastics, resins, polysaccharides, silica or silica-based materials, carbon, metals, inorganic glasses, membranes, or any of the above-listed substrate materials. The substrate may for example have the thickness of a glass microscope slide. Substrates transparent to light can be useful for specific optical detection methods.

Various methods are known in the art which may be used for preparing an insert of the biological chip's type, for example the techniques disclosed in U.S. Pat. No. 5,143,854, WO 92/10092, WO 90/15070, U.S. Pat. No. 5,874,219, which documents are herewith incorporated by reference. For example, probes of interests may be applied on the basis of a combination of photolithographic and fabrication techniques. The area on a section on the insert occupied by probe material may be as small as a few microns or even a single molecule.

In particular, a depressed structure (e.g. in form of bowls, stars, spots, rectangles) may be applied on the substrate surface, in which structure said probes are located. This structure can be for example produced during the application of the respective probes.

One or more probes may be provided in said at least one section. Examples of probes include, but are not restricted to, oligonucleotides, nucleic acids, agonists and antagonists for cell membrane receptors, toxins and venoms, viral epitopes, hormones (e.g., opioid peptides, steroids, etc.), hormone receptors, peptides, enzymes, enzyme substrates, cofactors, drugs, lectins, sugars, oligosaccharides, proteins, and monoclonal antibodies.

In particular, targets may be present in the sample applied to the modular array arrangement of the present invention. Targets can be employed in their unaltered state or as aggregates with other species and may be both naturally-occurring and man-made molecules. Examples of targets which can be employed by this invention include, but are not restricted to, nucleic acids, oligonucleotides, peptides, antibodies, cell membrane receptors, monoclonal antibodies and antisera reactive with specific antigenic determinants, drugs, cofactors, lectins, sugars, polysaccharides, cells, cellular membranes, and organelles. In particular, tagged targets and/or probes, comprising markers such as e.g. fluorescent markers, chemiluminescent markers, colorimetric markers, light scattering markers or radioactive markers can be used.

As mentioned above, the insert may be provided with a cover, e.g. in the form of a film or a membrane for preventing contamination or spoiling of the substances present on the insert. This cover may be removed before use or a sample may be added e.g. by a syringe through the cover, in particular a self-resealing cover. In particular, a cover optionally allows the presence of a protective atmosphere, such as e.g. a nitrogen or argon atmosphere over the inserts. Also, a semi-permeable membrane can be used as a cover.

According to an embodiment of the present invention, the modular array arrangement may be arranged on a slide, which slide e.g. can have the standard dimensions of slides used for microscopy and may be made of a material as indicated above as material appropriate as a substrate or carrier material. On this slide a carrier element can be arranged which comprises locations for receiving an insert. Such a carrier element may be made of any material indicated above as a material appropriate for a substrate or a carrier. In this carrier element, inserts in form of an incubation area may be introduced, comprising e.g. probes on sections on the insert as indicated above, or the carrier element itself may present the incubation area.

According to yet another embodiment of the present invention, an insert may be provided with insert wells for cultivating or testing e.g. bacterial strains or for receiving specimen of tissues, blood, etc.

In particular, a first connecting means may be in form of a projecting element arranged on said insert, and said second connecting means being adapted to receive said projecting element. An example for such a specific arrangement is shown in FIG. 1.

The modular array arrangement may be used together with devices for handling fluids, in particular for adding and removing fluids, and reading devices as known in the state of the art.

The present invention also provides a method of preparing a modular array arrangement comprising the steps of providing a carrier, providing one or more inserts for attachment to said carrier, said at least one insert having a first connecting means arranged on or formed in at least one of the external walls of said at least one insert, said insert having at least one section defined for receiving a sample, said at least one section, and said carrier having at least one location for receiving one of said at least one insert(s) and comprising a second connecting means, said second connecting means being arranged in, adjacent to or formed by said at least one location, said first connecting means unambiguously matching with said second connecting means. This method also comprises the additional step of contacting said first connecting means with said second connecting means, and thereby aligning said at least one insert in an predetermined orientation in or on said carrier.

A modular array arrangement of the present invention may be used for performing a detection reaction, in particular a detection reaction selected from the group consisting of DNA detection reaction, RNA detection reaction, protein detection reaction, and antibody based detection reaction, in particular in the low density range.

In particular, the present invention provides the possibility that the shape and design of modular array arrangements according to the present invention may be adapted to the requirements of devices, in particular reading or pipetting devices, already known in the state of the art.

The present invention will be described now in detail on basis of the following non-limiting examples given by way of an example only.

An insert in form of a ring 10 having sixteen insert wells 12 formed therein is shown in FIG. 1. On the external side wall 14 a connecting means 16 is formed. The connecting means comprises two arms 18, 20 and a web 22 connected to said arms 18, 20 which serves as a spacer between the arms 18, 20 and external side wall 14. The arms 18, 20 serve as a grip during the insertion of the insert in the carrier 24 and permit that a user will not come into contact with rings 10 or insert wells 12 and helps thereby to avoid a contamination of insert wells 12 with external material. For specific applications wherein e.g. high requirements with respect to sterility have to be met, an additional cover will be applied on the ring which will be removed only when the wells are finally mounted. The injection-molded ring is made of polystyrene and provided on its upper surface, wherein wells 12 are located, with a coating of streptavidin. The wells 12 which are in bowl form are spotted with the probes labeled with biotin. The probes are arranged essentially in the center of wells 12. Ring 10 has a diameter which permits an insertion in a well of a 96 well standard plate and is thus slightly smaller than the internal diameter of such a standard well (6.3 mm), for example about 6.0 mm. The carrier for receiving the inserts has wells essentially dimensioned and shaped as known from a standard microtiter plate, such as e.g. available from manufacturers such as Greiner Bio-One, Inc., Longwood, Fla., Nalge Nunc International Corporation, Rochester, N.Y., Eppendorf A G, Hamburg, Germany, other manufacturers or a custom made plate.

Figure 2:
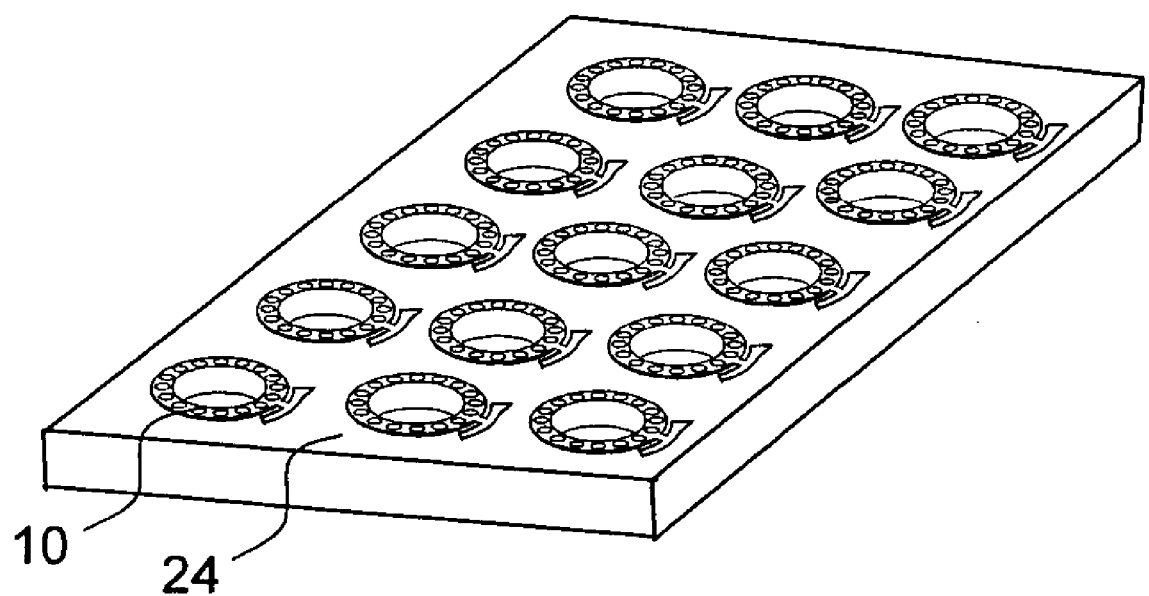
FIG. 2 shows a micro-plate comprising 15 insert receiving locations provided with connecting means of the lock-type wherein 15 inserts of FIG. 1 have been arranged.

FIG. 2 shows an example of a custom-made microtiter plate 24 wherein 15 ring inserts 10 as shown in FIG. 1 are arranged.

Figure 3:
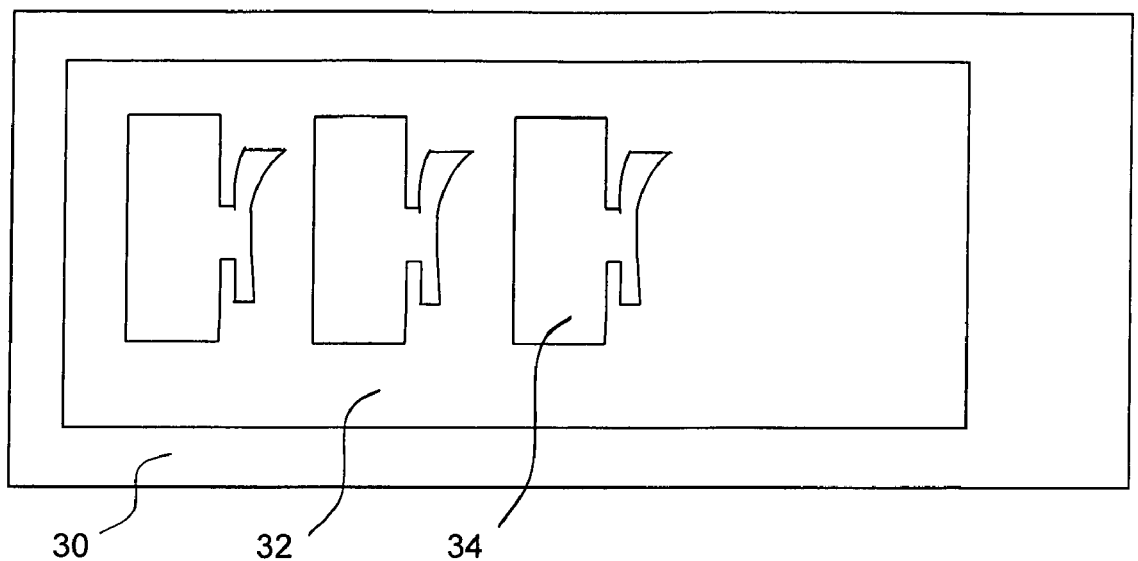
FIG. 3 shows a slide comprising a hybridization frame with three insert receiving locations, each provided with a connecting means of the lock-type, and three inserts in form of an incubation area element having a connecting means of the key-type.

FIG. 3 shows another embodiment according to the present invention. On a slide 30 hybridization frame or carrier 32 with three inserts or incubation areas 34 is arranged. Slide 30 is made of glass and has height of 1.0 mm The hybridization frame 32 is made of polyvinyl chloride and is attached to slide 30 by double-sided adhesive tape. The incubation area 34 is made of polystyrene coated with streptavidin and is provided with spots of biotinylated oligonucleotides attached by the high affinity interaction of streptavidin and biotin to the surface of the inserts.

What is claimed is:

1. A modular array arrangement for use in a screening assay comprising:
    a carrier; and
    at least one insert for attachment to said carrier, said at least one insert having a first connecting means arranged on at least one of the external wall of said at least one insert so as to extend outward therefrom, said carrier having at least one location for receiving one of said at least one insert and comprising a second connecting means, said second connecting means being arranged in, adjacent to, or formed by said at least one location, wherein said first connecting means or said second connecting means have first and second portions having different cross-sectional shapes so as to define an asymmetric structure or form, said first connecting means unambiguously matching with said second connecting means, said unambiguously matching permitting the alignment of said at least one insert in a predetermined orientation in or on said carrier so as to prevent rotational movement of the at least one insert in the carrier and excluding an incorrect insertion of said at least one insert, and said insert having at least one section defined for receiving a sample, said at least one section being provided with or adapted for receiving operational means wherein said first connecting means, or said second connecting means is adapted to serve as a grip that extends outward from the insert a distance sufficient to permit transfer of the insert by a user or an automated machine while reducing the potential, of contact by the user or the automated machine of the contents of the insert.

2. The modular array arrangement according to claim 1, wherein said first connecting means is essentially or partially complementary to said second connecting means.

3. The modular array arrangement according to claim 1, wherein said first and second portions comprise first and second arms.

4. The modular array arrangement according to claim 1, wherein said insert is releasably or non-releasably connected to said carrier upon attachment to said carrier.

5. The modular array arrangement according to claim 1, wherein an insert is provided with one or more additional first connecting means or an insert receiving location is provided with one or more additional second connecting means.

6. The modular array arrangement according to claim 1, said operational means being selected from the group consisting of compounds attached to the insert surface, media, reagents, solvents, catalysts, coatings, and beads.

7. A modular array arrangement for use in a screening assay comprising:
    a carrier; and at least one insert for attachment to said carrier, said at least one insert having a first connecting means arranged on in at least one of the external walls of said at least one insert so as to extend outward therefrom, said carrier having at least one location for receiving one of said at least one insert and comprising a second connecting means, said second connecting means being arranged in, adjacent to, or formed by to said at least one location, wherein said first connecting means or said second connecting means have first and second portions having different cross-sectional shapes so as to define an asymmetric structure or form, said first connecting means unambiguously matching with said second connecting means, said unambiguously matching permitting the alignment of said at least one insert in a predetermined orientation in or on said carrier such that said at least one insert is held in a fixed orientation with respect to the carrier so that rotational movement therebetween is prevented when the first and second connecting means are engaged with each other and excluding an incorrect insertion of said at least one insert, said first connecting means being a projecting element arranged on said insert, said second connecting means being adapted to receive said projecting element and said insert having at least one section defined for receiving a sample.

8. The modular array arrangement according to claim 7, wherein said first connecting means is essentially or partially complementary to said second connecting means.

9. The modular array arrangement according to claim 7, wherein said first and second portions comprise first and second arms.

10. The modular array arrangement according to claim 7, wherein said first connecting means or said second connecting means is adapted to serve as a grip.

11. The modular array arrangement according to claim 7, wherein said insert is releasably or non-releasably connected to said carrier upon attachment to said carrier.

12. The modular array arrangement according to claim 7, wherein an insert is provided with one or more additional first connecting means or an insert receiving location is provided with one or more additional second connecting means.

13. An insert for attachment to a carrier, said insert having first connecting means arranged on or formed in at least one of the external walls of said at least one insert, adapted to engage with second connecting means, present in a carrier having at least one location for receiving said insert, said second connecting means being arranged in, adjacent to, or formed by to said at least one location.

14. A method of preparing a modular array arrangement in a screening assay comprising the steps of:
providing a carrier; and
providing one or more inserts for attachment to said carrier, said at least one insert having a first connecting means arranged on in at least one of the external walls of said at least one insert so as to extend outward therefrom, said insert having at least one section defined for receiving a sample, said at least one section being provided with or adapted for receiving operational means, and said carrier having at least one location for receiving one of said at least one insert and comprising a second connecting means, wherein said first connecting means or said second connecting means have first and second portions having different cross-sectional shapes so as to define an asymmetric structure or form, said second connecting means being arranged in, adjacent to, or formed by said at least one location, said first connecting means unambiguously matching with said second connecting means such that said at least one insert is held in a fixed orientation with respect to the carrier so that rotational movement therebetween is prevented when the first and second connecting means are engaged with each other and such that an incorrect insertion of said at least one insert is excluded.

15. The method of claim 14, said method further comprising the step of contacting said first connecting means with said second connecting means, and thereby aligning said at least one insert in a predetermined orientation in or on said carrier.

16. The method of preparing a modular array arrangement according to claim 4, wherein said first and second portions comprise first and second arms.

* * * * *

UNITED STATES PATENT AND TRADEMARK OFFICE
CERTIFICATE OF CORRECTION

PATENT NO. : 7,219,800 B2
APPLICATION NO. : 10/783412
DATED : May 22, 2007
INVENTOR(S) : Sven Bulow Page 1 of 1

It is certified that error appears in the above-identified patent and that said Letters Patent is hereby corrected as shown below:

In Column 1, Line 27, please delete "nueleotides" and replace with --nucleotides--, therefor;
In Column 5, Line 47, please delete "be," and insert --be--, therefor;
In Column 8, Line 40, in Claim 1, please delete "means," and insert --means--, therefor;
In Column 8, Line 44, in Claim 1, please delete "potential," and insert --potential--, therefor;
In Column 9, Line 24, in Claim 7, please delete "element" and insert --element,-- therefor.

Signed and Sealed this

Thirtieth Day of October, 2007

JON W. DUDAS
*Director of the United States Patent and Trademark Office*